US006302360B1

(12) United States Patent
Ng

(10) Patent No.: US 6,302,360 B1
(45) Date of Patent: Oct. 16, 2001

(54) VORTEX GENERATION FOR CONTROL OF THE AIR FLOW ALONG THE SURFACE OF AN AIRFOIL

(75) Inventor: T. Terry Ng, Sylvania, OH (US)

(73) Assignee: The University of Toledo, Toledo, OH (US)

( * ) Notice: Subject to any disclaimer, the term of this patent is extended or adjusted under 35 U.S.C. 154(b) by 0 days.

(21) Appl. No.: 09/480,198

(22) Filed: Jan. 10, 2000

(51) Int. Cl.$^7$ .......................... B64C 13/16; B64C 21/04; B64C 21/06; B64C 23/06; B64C 1/38
(52) U.S. Cl. .......................... 244/203; 244/199; 244/130; 244/209; 244/208
(58) Field of Search .................................. 244/134, 130, 244/208, 199, 203, 204, 209; 296/180.1

(56) References Cited

U.S. PATENT DOCUMENTS

| 2,951,662 | | 9/1960 | Theodorsen . | |
|---|---|---|---|---|
| 4,733,834 | * | 3/1988 | Phillips, II | 244/134 R |
| 5,114,100 | * | 5/1992 | Rudolph et al. | 244/134 |
| 5,348,256 | * | 9/1994 | Parikh | 244/208 |
| 5,374,013 | * | 12/1994 | Bassett et al. | 244/130 |
| 5,598,990 | * | 2/1997 | Farokhi et al. | 244/199 |
| 5,755,408 | * | 5/1998 | Schmidt et al. | 244/199 |
| 5,908,217 | * | 6/1999 | Englar | 296/180.1 |
| 5,988,522 | | 11/1999 | Glezer et al. . | |
| 6,092,990 | * | 7/2000 | Hassan et al. | 244/199 |
| 6,105,904 | * | 8/2000 | Lisy et al. | 244/199 |

FOREIGN PATENT DOCUMENTS 405016892   1/1993   (JP) .

OTHER PUBLICATIONS

J. Aircraft, vol. 35, No. 1: Engineering Notes/Control of Leading–Edge Vortices with Suction.
Aero–MEMS Lab/Conformable M3 Microsystems for Aerodynamic Control.
Proceedings of the 3rd ASME/JSME Joint Fluids Engineering Conference—Jul. 18–23, 1999, San Francisco, California/Active Feedback Control of Leading Edge Separation.
Popular Science Mar. 1995/Aviation.
The Wall Street Journal—Friday, Nov. 25, 1994/Tiny Flaps on Jets May Offer Airlines Big Savings in Fuel.
Journal of Aircraft, vol. 32, No. 5, Sep.–Oct. 1995/Analysis of Tangential Slot Blowing on F/A–18 Isolated Forebody.

* cited by examiner

Primary Examiner—Charles T. Jordan
Assistant Examiner—Christian M. Best
(74) Attorney, Agent, or Firm—MacMillan, Sobanski & Todd, LLC

(57) ABSTRACT

Apparatus for generating vortices to control the flow of air across a airfoil of an aircraft includes a series of pressure active regions arranged along the leading edge of the airfoil. The pressure active regions include spaced apart valves connected to a source of vacuum, a controller for activating the valves, and sensors for sensing air pressure. The controller is configured to activate the valves in response to the pressure sensed by the sensors, wherein the spaced apart valves are connected to a source of pressurized air as well as to the source of vacuum.

24 Claims, 3 Drawing Sheets

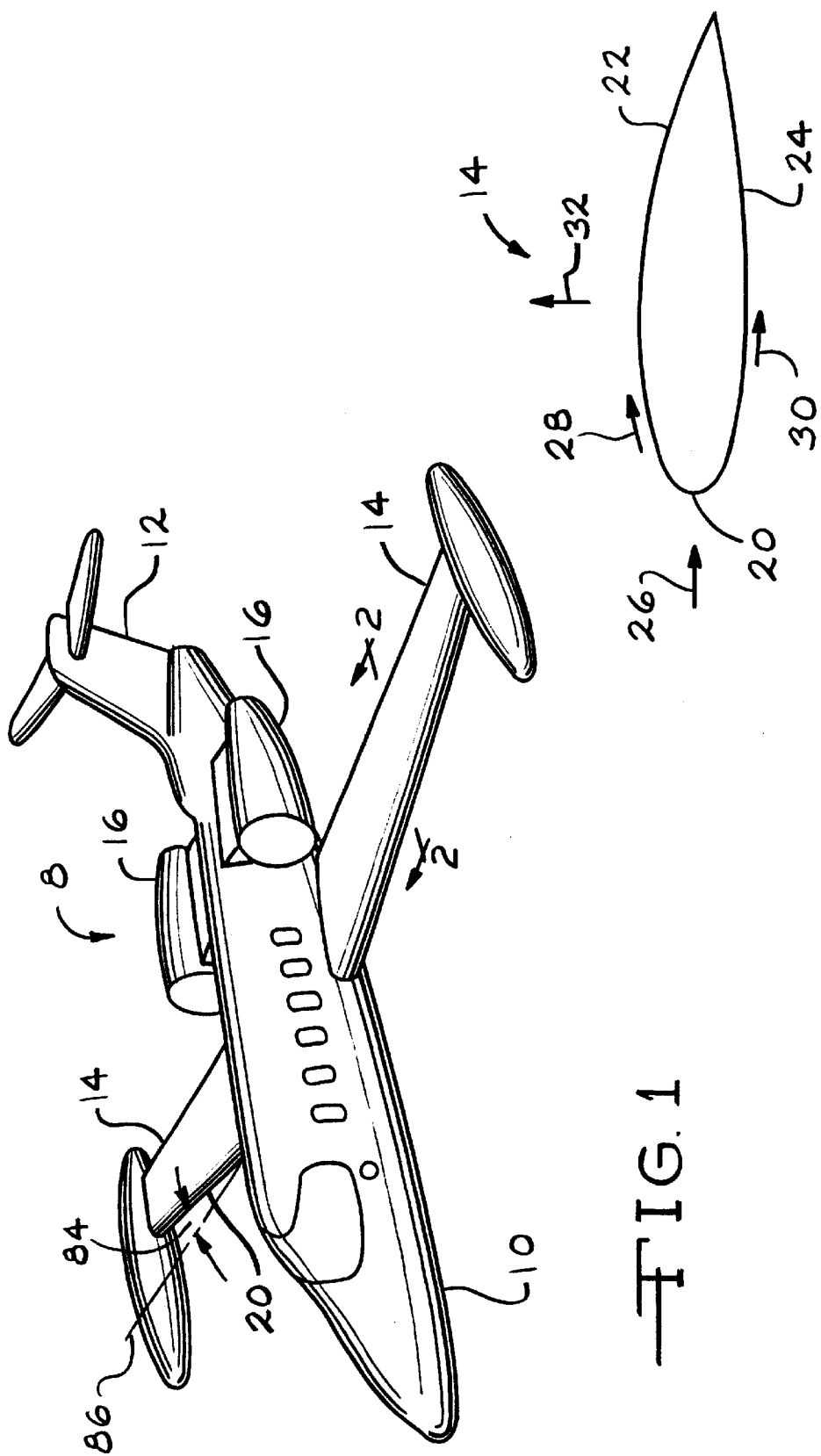

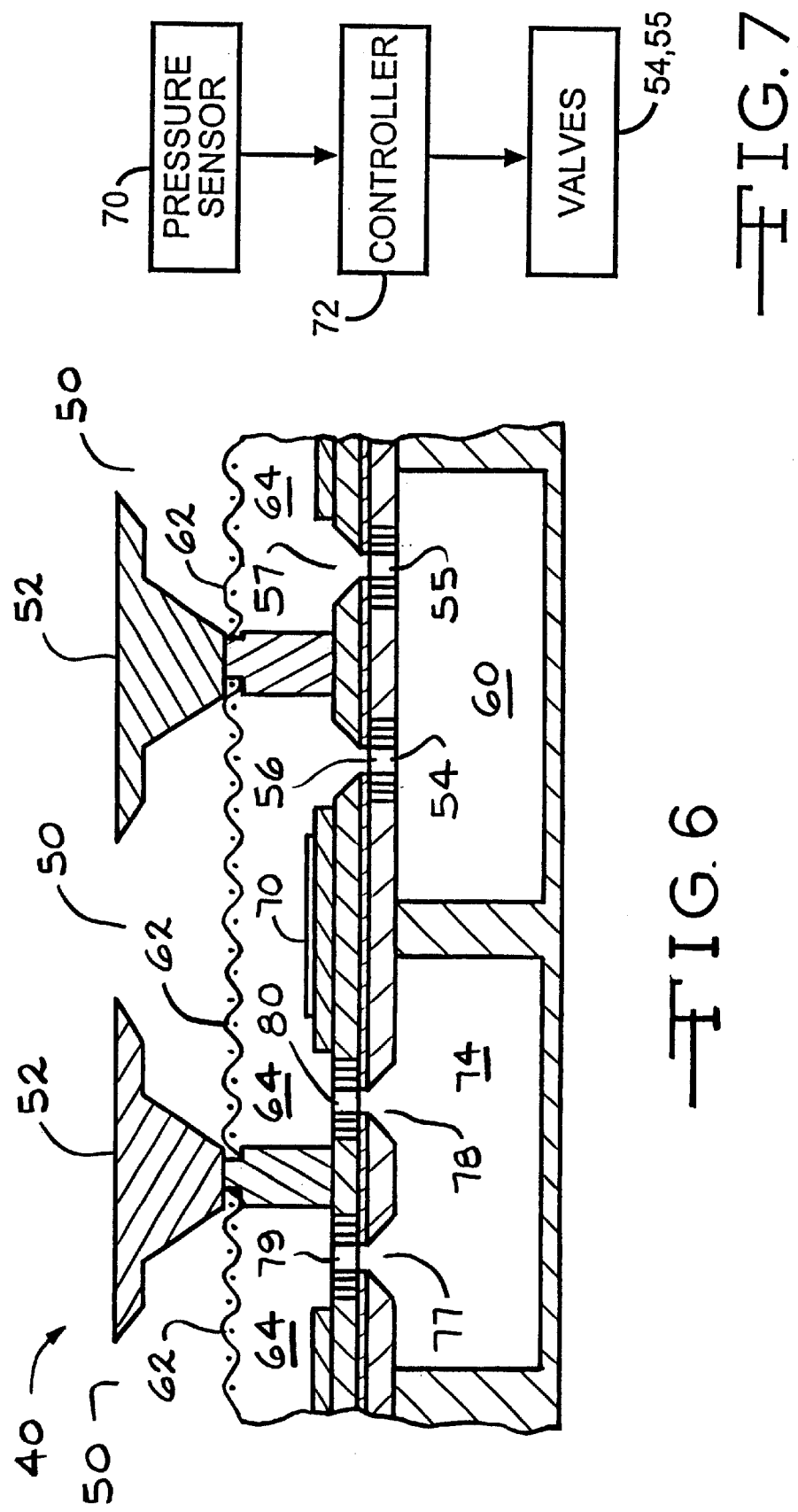

VORTEX GENERATION FOR CONTROL OF THE AIR FLOW ALONG THE SURFACE OF AN AIRFOIL

TECHNICAL FIELD

This invention relates to a method of affecting the flow of air passing along the surfaces, such as the wing or fuselage, of an aircraft. More particularly, this invention pertains to controlling the air flow along an aircraft surface to decrease the tendency of the flow to separate from the surface.

BACKGROUND OF THE INVENTION

In numerous mechanical and aeronautical applications it is desirable to control the flow of fluid across a surface. In conventional airplanes, for example, the air flowing above and below the wing at different speeds creates the lift necessary to raise or elevate the plane off the ground. The curvature of the upper surface of the wing causes the air to flow across the surface of the top of the wing at a speed faster than the speed of the air flowing across the bottom of the wing. The faster air flow across the top surface of the wing creates a reduced pressure region along the top surface of the wing. A high pressure zone is created along the bottom side of the wing, due to the generally flat lower surface, thereby generating a net upward force.

As the angle of attack of an airplane wing is increased, such as for example during a steep takeoff, there is a tendency of the air flow passing across the top surface of the wing to become destabilized and separate from the wing. This flow separation could bring disastrous results because the reduced pressure zone on the wing top surface is diminished, and the lift is dramatically reduced while the drag is substantially increased. Accordingly, it is beneficial to ensure that the air flow not separate from the top surface of the wing, or at least if flow separation occurs there is a mechanism to reattach the flow to the wing surface. Another area where it is necessary for an air flow to be maintained in contact with a surface is in jet engines. A generally attached flow along the surface of the air intake is preferred for a stable operation.

There have been past attempts to ensure that the flow of air does not separate from the surfaces of a airfoil. For purposes of this invention, an airfoil is defined as a part or surface of an aircraft, such as a wing, aileron or rudder, vertical tail, horizontal tail, and the like, whose shape and orientation control the stability, direction, lift, thrust or propulsion of an aircraft by virtue of the flow of fluid, such as air, with respect to the airfoil. It is known that increasing the turbulence on the top surface of the wing can reduce the tendency of the air flow to separate from the wing top surface. Mechanical vortex generators are currently used on airplanes to increase turbulence on the top surface of the wing and thereby enable a higher angle of attack without separation. See, for example, U.S. Pat. No. 5,755,408 to Schmidt et al., which the raising of a boundary layer penetrator generates vortices capable of reattachment of the air flow. Unfortunately, mechanical vortex generators impose a significant air drag to the plane during cruising. Retractable mechanical vortex generators have been considered, but they are relatively slow in response, and can impose a significant weight penalty.

Past attempts to more efficiently create upper wing surface vortices for increased flow control include pneumatic vortex generators based on both suction and blowing. It has been proposed to use an array of uniform suction ports along the leading edge of a wing to try to control air flow separation from the wing, but this apparatus does not generate vortices. An improvement in suction control was disclosed in a paper entitled "Separation Control Through the Translative Instability", by the present inventor. This paper sets forth an air flow control apparatus using an array of vortex generators spaced along the leading edge of the wing. Each of the vortex generators consisted of a generally triangular shaped region of suction arrays consisting of small holes all connected to a suction manifold. The vortices generated by each of the suction arrays help the flow of air stay connected to the top surface of the wing.

One of the shortcomings of the apparatus using triangular shaped suction arrays of small holes described above is the fact that the suction arrays are fixed in place, and cannot easily be controlled to accommodate changing conditions during operation of the aircraft. It would be beneficial if there could be developed an airfoil vortex generating system that provides better control of each vortex generated by the apparatus. Further, it would be advantageous if the apparatus could be self cleaning, and could be adapted with sensors and controllers to enable feedback for controlling the operation of the vortex generators and the reattachment of the air flow along the top of the wing. Optimally, such system will present a hydrodynamically smooth surface for minimal drag and for reducing the unwanted generation of turbulence in the air flow when such turbulence is not required. Preferably, the system could be adapted for use on aircraft having moderate leading edge sweeps as well as on conventional aircraft having low leading edge sweeps.

SUMMARY OF THE INVENTION

The above objects as well as other objects not specifically enumerated are achieved by apparatus for generating vortices to control the flow of air across an airfoil of an aircraft comprising a series of pressure active regions arranged along the leading edge of the airfoil. The pressure active regions include spaced apart valves connected to a source of vacuum. A controller for activating the valves is provided.

According to this invention, there is also provided apparatus for generating vortices to control the flow of air across an airfoil of an aircraft comprising a series of pressure active regions arranged along the leading edge of the airfoil. The pressure active regions include spaced apart valves connected to a source of vacuum, a controller for activating the valves, and sensors for sensing air pressure. The controller is configured to activate the valves in response to the pressure sensed by the sensors. The spaced apart valves are connected to a source of pressurized air as well as to the source of vacuum.

According to this invention, there is also provided apparatus for controlling naturally occurring vortices associated with an airfoil of an aircraft comprising pressure active regions positioned on the airfoils. The pressure active regions include spaced apart valves connected to a source of vacuum, and a controller for activating the valves.

According to this invention, there is also provided apparatus for generating vortices to control the flow of air along an aircraft comprising pressure active regions arranged on the fuselage of the aircraft. The pressure active regions include spaced apart valves connected to a source of vacuum, and a controller for activating the valves.

According to this invention, there is also provided apparatus for generating vortices to control the flow of air along the surface of a jet engine comprising pressure active regions arranged along the one or more surfaces of the jet engine. The pressure active regions include spaced apart valves connected to a source of vacuum, and a controller for activating the valves.

Various objects and advantages of this invention will become apparent to those skilled in the art from the following detailed description of the preferred embodiment, when read in light of the accompanying drawings.

BRIEF DESCRIPTION OF THE DRAWINGS

FIG. 1 is a schematic view in perspective of an airplane adapted with the vortex generating system of the invention.

FIG. 2 is a schematic cross-sectional view of an airplane wing of the airplane illustrated in FIG. 1, taken along line 2–2.

FIG. 6 is a schematic view in elevation of the vortex generator of the invention.

FIG. 7 is a schematic diagram of the control system of the invention.

DETAILED DESCRIPTION OF THE INVENTION

Figure 5:
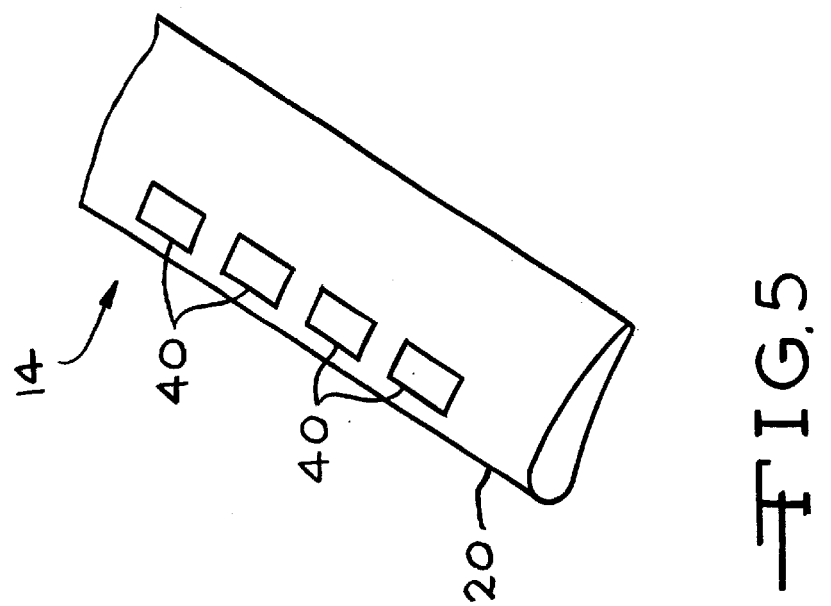
FIG. 5 is a view similar to that shown in FIG. 4, illustrating the vortex generators of the invention.

As shown in FIG. 1, an airplane is indicated generally at 8. The airplane can be any type of aircraft, including the subsonic commercial jet illustrated, as well as military aircraft, supersonic transports such as the Concorde, space craft such as the Space Shuttle and missiles. The airplane 8 includes a fuselage 10, a tail 12, wings 14, and jet engines 16. The wings 14 and tail 12 are considered to be airfoils for purposes of this invention. The wings have a leading edge 20, as shown in FIG. 2. The wing 14 can be any type of airfoil suitable for providing lift to the airplane.

The cross-sectional profile of the wing 14 includes an upper surface 22 that has a longer curvature than the curvature of the lower wing surface 24. The leading edge 20 of the wing 14 causes the air medium, indicated by the arrow at 26, to be divided into an upper flow, indicated by the arrow at 28, and a lower flow, indicated at arrow 30. The longer curvature of the upper surface 22 of the wing causes the air to flow across the upper surface at a speed faster than the speed of the air flowing across the lower wing surface. The faster air flow across the upper surface of the wing creates a reduced pressure region along the top of the wing. A higher pressure zone is created along the bottom side of the wing, due to the generally flat lower wing surface 24, thereby generating a net upward force, indicated by lift arrow 32. The pressure active regions provide increased lift and advantageously improve the lift-to-drag ratio.

Figure 3:
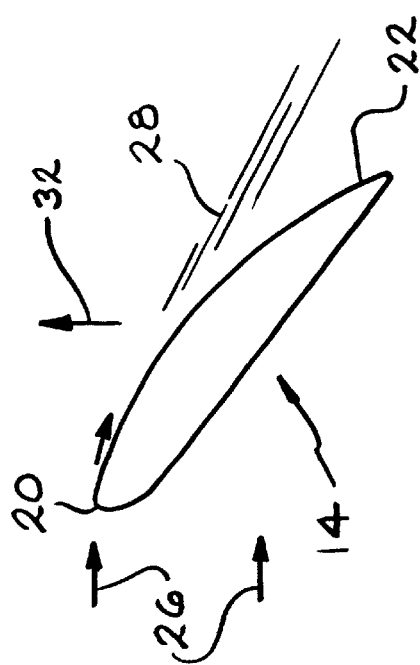
FIG. 3 is a schematic cross-sectional view of the airplane wing shown in a mode of high angle of attack.

As shown in FIG. 3, when the wing 14 is operated at a high angle of attack with respect to the relative direction of the air medium 26, the upper flow 28 can become separated from the upper wing surface 22. Such a separation of the upper air flow 28 interferes with the zone of negative pressure (i.e., negative gauge pressure) associated with attached flow, and the lift 32 is greatly diminished while the drag is greatly increased.

Figure 4:
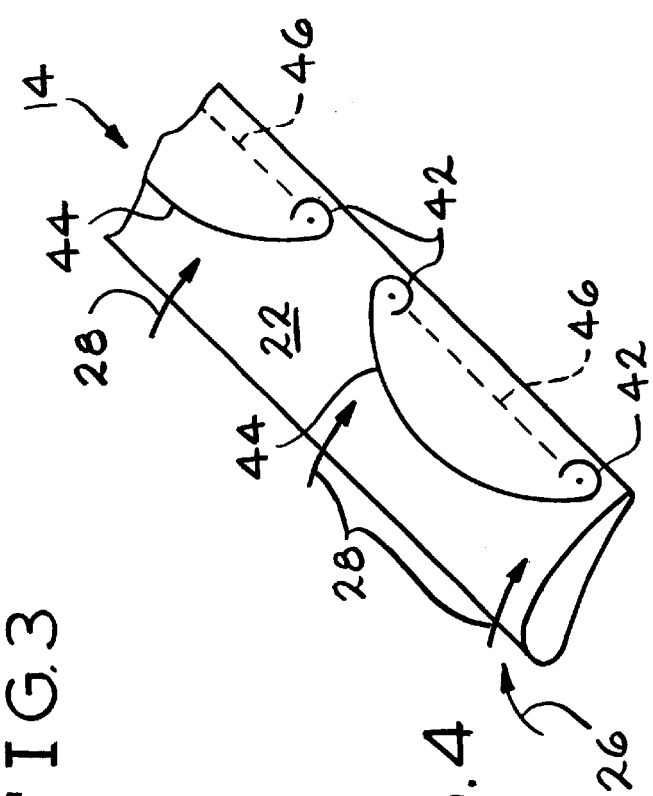
FIG. 4 is schematic view in perspective of a portion of the airplane wing, illustrating vortices for reattachment of the air flow to the top surface of the wing.

As shown in FIG. 5, a series of pressure active regions 40 are arranged along the leading edge 20 of the wing 14. Although shown as rectangular in shape for illustrative purposes, the pressure active regions can have any suitable shape. The pressure active regions 40 are connected to a source of partial vacuum, as will be explained in connection with the description of FIG. 6. As shown in FIG. 4, the pressure active regions generate vortices 42 that are capable of acting to reattach the upper flow 28 to the wing upper surface. It has been found that the discrete suction of the pressure active regions 40 is a potentially highly effective means of controlling separated flows.

FIG. 4 shows a portion of the airplane wing 14 with the upper flow 28 being detached or separated from the upper wing surface 22 along a separation line 44. The vortices 42 are acting to reattach the upper flow 28 along a reattachment line, illustrated as a phantom line 46 in FIG. 4. It is believed that the vortices transfer high momentum fluid from the freestream onto the surface, leading to a reattachment of the separated flow. This reattachment of the separated boundary layer greatly diminishes the potentially disastrous results of a dramatic loss of lift from the wing. Safety is increased, fuel savings can be realized, and the lift on the wing can even be operated to control maneuvering of the airplane in the event of a malfunction of ailerons. Since most of the power comes from the upper air flow 28, the power requirement for generating the vortices of the invention is very low. Ideally, adjacent vortices are produced in the form of counter-rotating pairs, as shown in FIG. 4.

As shown in FIG. 6, the pressure active regions 40 are comprised of a plurality of surface orifices 50 defined by a matrix of airfoil surface structures 52. The airfoil surface structures 50 are configured to conform to the general shape of the upper wing surface 22 to minimize drag. A plurality of spaced apart valves indicated at 54 and 55 are positioned at inlets 56 and 57, respectively of a vacuum chamber 60. Preferably, the valves contain a flap, not shown, that operates to open and close the valves as directed by electrostatic forces. Other valve configurations could also be used. When the valves 54 and 55 are open, the negative pressure in the vacuum chamber 60 causes a withdrawal of air from the upper wing surface through the surface orifices 50. Therefore, it can be seen that the opening of the valves 54 and 55 causes the pressure active region 40 to generate a net inflow of air from the upper flow 28 of air traveling across the upper surface 22 of the wing. This net inflow of air causes a disturbance in the upper flow 28, resulting in the generation of vortices 42, which act beneficially to reattach the air flow 28 to the upper surface 22. The air pressure can be any suitable negative gauge pressure, such as a pressure within the range of from about 0.9 atmospheres to about 0.1 atmospheres.

A screen, such as filter 62, can be inserted between the valves (54, 55) and the surface orifices 50 to eliminate intrusion by such substances as condensed liquids or solid particles which are potentially harmful to the valves. A pressure zone 64 is defined between the filter 62 and the valves 54 and 55. The valves 54 and 55 are operated or controlled electrically, and are preferably individually controlled. In a preferred embodiment the valves are micro valves having a very small diameter. Preferably the valves, when fully open, define air passages having an effective opening with a cross-sectional area smaller than about 5 mm$^2$. More preferably the air passages have an effective opening with a cross-sectional area no larger than about 2.0 mm$^2$. Advantageously, the valves are provided with a cleaning system so that the openings are maintained for the desired throughput. Most preferably, the valves are self cleaning, whereby a blast of pressurized air through the air flow passages of the pressure active region clears the valves and filter of dirt and other obstructions. The density of the valves within the pressure active regions is preferably at least 3 valves per cm², and more preferably at least 10 valves per cm².

A particularly advantageous control system for use with the vortex generation apparatus of the invention is a micro electrical mechanical system (MEMs) system, available from Orbital Research Inc., Cleveland, Ohio. The MEMs system has been adapted for use with Braille systems. The micro electrical mechanical system enables both the changing of the suction pattern within a pressure active region, and, if desired, and the use of a fixed suction pattern with a varying suction rate.

A plurality of pressure sensors 70 are positioned in various appropriate places within the pressure active region 40, such as within the pressure zone 64. The pressure sensors can be any type of sensor suitable for measuring the pressure as needed. The pressure sensor can be a piezoelectric device which generates an electrical signal in response to a sensed pressure. As shown in FIG. 7, the pressure sensors are connected to a controller 72. The controller 72 is also connected to the valves 54 and 55. Once a condition of high pressure is indicated by the sensors 70 (such as might occur upon separation of the upper air flow 28 from the upper wing surface 22), then the pressure active region 40 will respond by having the controller activate the valves 54, 55 to an open status. This will connect the surface orifices 50 with the vacuum chamber 60. As a result, there will be a withdrawal of air from the upper wing surface 22, and this will generate a vortex. Each valve can have an associated sensor so that the local pressure experience sensed by the sensor can be acted upon to control the activation of the nearby or associated valve. The controller can be any device, such as a computer, suitable for gathering information from the sensors 70 and directing the activation of the valves. Ideally, the ratio of valves to pressure sensors at least as low as 5:1 and preferably as low as 3:1.

It can be seen that a number of pressure active regions 40 can be installed for operation at a number of places on the wing 14 of the aircraft 8. Where a plurality of pressure active regions are employed, the controller, such as controller 72, can be programmed and connected to each of the pressure active regions 40 so that the output from all of the pressure active regions will be coordinated. This will enhance aircraft lift, range and maneuverability. Also, specific patterns of activation of the pressure active regions can be pre-established to handle routine events, such as takeoff and landing. Other factors, such as wind speed, wind shear and other climatological factors can also be incorporated into the control scheme. A particular advantage of using the invention is that the pattern of the flow established to handle one particular set of aerodynamic flow conditions with respect to the airfoil can be reconfigured by the controller 72.

There may be some control schemes that require a positive pressure rather than a negative pressure in the vicinity of the surface orifices 51. Therefore, the pressure active regions 40 can be adapted with a positive pressure chamber 74, which can be connected to the pressure zone 64 via openings 77 and 78, which are controlled by valves 79 and 80. The valves 79 and 80 could be controlled by the computer in response to the sensed pressure by the pressure sensors 70.

The pressure active regions 40 of the invention can also be used to control the flow of air along the surfaces of various other devices, such as for example the jet engines 16. The air flow in the jet intake and nozzle areas can be controlled to limit or avoid separation of the boundary layer, and therefore the performance of the jet engine can be maintained and the noise of the jet engine can be controlled. The use of the pressure active regions 40 on aircraft engines is particularly beneficial because the airflow across the engine surfaces can be controlled with a device that is light weight and not bulky is size.

In addition to the use of the pressure active regions of the invention on conventional aircraft as illustrated in FIGS. 1–5, the pressure active regions can also be used for controlling the flow of air across various other airfoils of other aircraft. For example, military aircraft, including fighter planes and attack planes, such as the Warthog, can also be adapted with the pressure active regions of the invention. Also, the pressure active regions of the invention can be used to control the pressure distribution around the nosecone of a missile, or to control air flow patterns occurring in cylindrical air-borne bodies in general. Such control of the pressure distribution could be helpful in reducing vibration in missiles.

A particular advantage of the invention is that it is useful for generating vortices to increase the lift of airfoils regardless of the angle of the leading edge sweep of the airfoil. The angle of the leading edge sweep of the airfoil is the angle 84 between the leading edge 20 of the wing or airfoil to the transverse axis 86 that is perpendicular to the fuselage 10. See FIG. 1. In conventional airplanes, including commercial jet airplanes, the leading edge sweep angle is usually a low angle, being no greater than about 40 degrees. In aircraft with mid-range leading edge sweep angles (40 to 60 degrees), such as an F-106 aircraft, the invention can also be used to an advantage. In aircraft with high leading edge sweep angles (above 60 degrees), such as the Space Shuttle or the Concorde, a rather large vortex is naturally generated on each wing surface. Therefore the pressure active regions 40 of the invention are not needed to generate the vortices. However, the pressure active regions can be used advantageously to control the natural vortices associated with the wings. To accomplish this, one or more pressure active regions 40 are positioned at strategic locations on the wing surfaces and/or the fuselage of the aircraft. These pressure active regions generate vortices that eventually coalesce into the primary vortex. By controlling the vortices generated by the pressure active regions, the control of the vortices by the pressure active regions of the invention can be effective in changing the strength, position and breakdown of the primary vortices relative to the airfoils as well as relative to the fuselage of the aircraft.

It is to be understood that the pressure active regions of the invention are not limited to being used on aircraft airfoils such as wings, tails, rudders and ailerons, but also can be used on the fuselages of the aircraft to control the separation of the air flow along the fuselage and the airfoils.

The principle and mode of operation of this invention have been described in its preferred embodiments. However, it should be noted that this invention may be practiced otherwise than as specifically illustrated and described without departing from its scope.

What is claimed is:

1. An apparatus for generating vortices to control the flow of air across an airfoil of an aircraft comprising a series of pressure active regions arranged along the leading edge of the airfoil wherein the pressure active regions include spaced apart valves connected to a source of vacuum, a controller for activating the valves, a plurality of sensors for sensing air pressure, wherein the controller is configured to activate the valves in response to the pressure sensed by the sensor, and said pressure sensors are interspersed in the pressure active region among a plurality of the spaced apart valves.

2. The apparatus of claim 1 in which the spaced apart valves are connected to a source of pressurized air as well as to the source of vacuum.

3. The apparatus of claim 1 in which the valves, when fully open, define air passages having a cross-sectional area smaller than about 5 mm$^2$.

4. The apparatus of claim 1 in which the valves are microvalves.

5. The apparatus of claim 1 in which the pressure active regions configured so that adjacent vortices will be counter-rotating.

6. The apparatus of claim 1 wherein each valve is associated with one of a plurality of pressure sensors detecting a local pressure and controlling the activation of the associated valve.

7. The apparatus of claim 1 wherein the ratio of valves to sensors is at most five to one and at least three to one.

8. An apparatus for generating vortices to control the flow of air across an airfoil of an aircraft comprising a series of pressure active regions arranged along the leading edge of the airfoil wherein the pressure active regions include spaced apart valves connected to a source of vacuum, a controller for activating the valves, and a plurality of sensors for sensing air pressure interspersed in the pressure active region among a plurality of the spaced apart valves wherein the controller is configured to activate the valves in response to the pressure sensed by the sensors, and wherein the spaced apart valves are connected to a source of pressurized air as well as to the source of vacuum.

9. The apparatus of claim 8 in which the valves, when fully open, define air passages having a cross-sectional area smaller than about 5 mm$^2$, and in which the pressure active regions configured so that adjacent vortices will be counter-rotating.

10. An apparatus for controlling naturally occurring vortices associated with an airfoil of an aircraft comprising pressure active regions positioned on the airfoil wherein the pressure active regions include spaced apart valves connected to a source of vacuum, a controller for activating the valves, a plurality of sensors for sensing air pressure interspersed in the pressure active region among a plurality of the spaced apart valves, wherein the controller is configured to activate the valves in response to the pressure sensed by the sensor.

11. The apparatus of claim 10 in which the spaced apart valves are connected to a source of pressurized air as well as to the source of vacuum.

12. The apparatus of claim 10 in which the valves, when fully open, define air passages having a cross-sectional area smaller than about 5 mm$^2$.

13. The apparatus of claim 10 in which the valves are microvalves.

14. The apparatus of claim 10 in which the pressure active regions configured so that adjacent vortices will be counter-rotating.

15. The apparatus of claim 10 wherein each valve is associated with one of a plurality of pressure sensors detecting a local pressure and controlling the activation of the associated valve.

16. The apparatus of claim 10 wherein the ratio of valves to sensors is at most five to one and at least three to one.

17. An apparatus for generating vortices to control the flow of air along an aircraft comprising pressure active regions arranged on the fuselage of the aircraft wherein the pressure active regions include spaced apart valves connected to a source of vacuum, a controller for activating the valves, a plurality of air pressure sensors interspersed in the pressure active region among a plurality of the spaced apart valves wherein the controller is configured to activate the valves in response to the pressure sensed by the sensors.

18. The apparatus of claim 17 in which the spaced apart valves are connected to a source of pressurized air as well as to the source of vacuum.

19. The apparatus of claim 17 in which the valves, when fully open, define air passages having a cross-sectional area smaller than about 5 mm$^2$.

20. The apparatus of claim 17 in which the valves are microvalves.

21. An apparatus for generating vortices to control the flow of air along the surface of a jet engine comprising pressure active regions arranged along one or more surfaces of the jet engine wherein the pressure active regions include spaced apart valves connected to a source of vacuum, a controller for activating the valves, a plurality of air pressure sensors interspersed in the pressure active region among a plurality of the spaced apart valves wherein the controller is configured to activate the valves in response to the pressure sensed by the sensors.

22. The apparatus of claim 21 in which the spaced apart valves are connected to a source of pressurized air as well as to the source of vacuum.

23. The apparatus of claim 21 in which the valves, when fully open, define air passages having a cross-sectional area smaller than about 5 mm$^2$.

24. The apparatus of claim 21 in which the valves are microvalves.

* * * * *